UNITED STATES PATENT OFFICE.

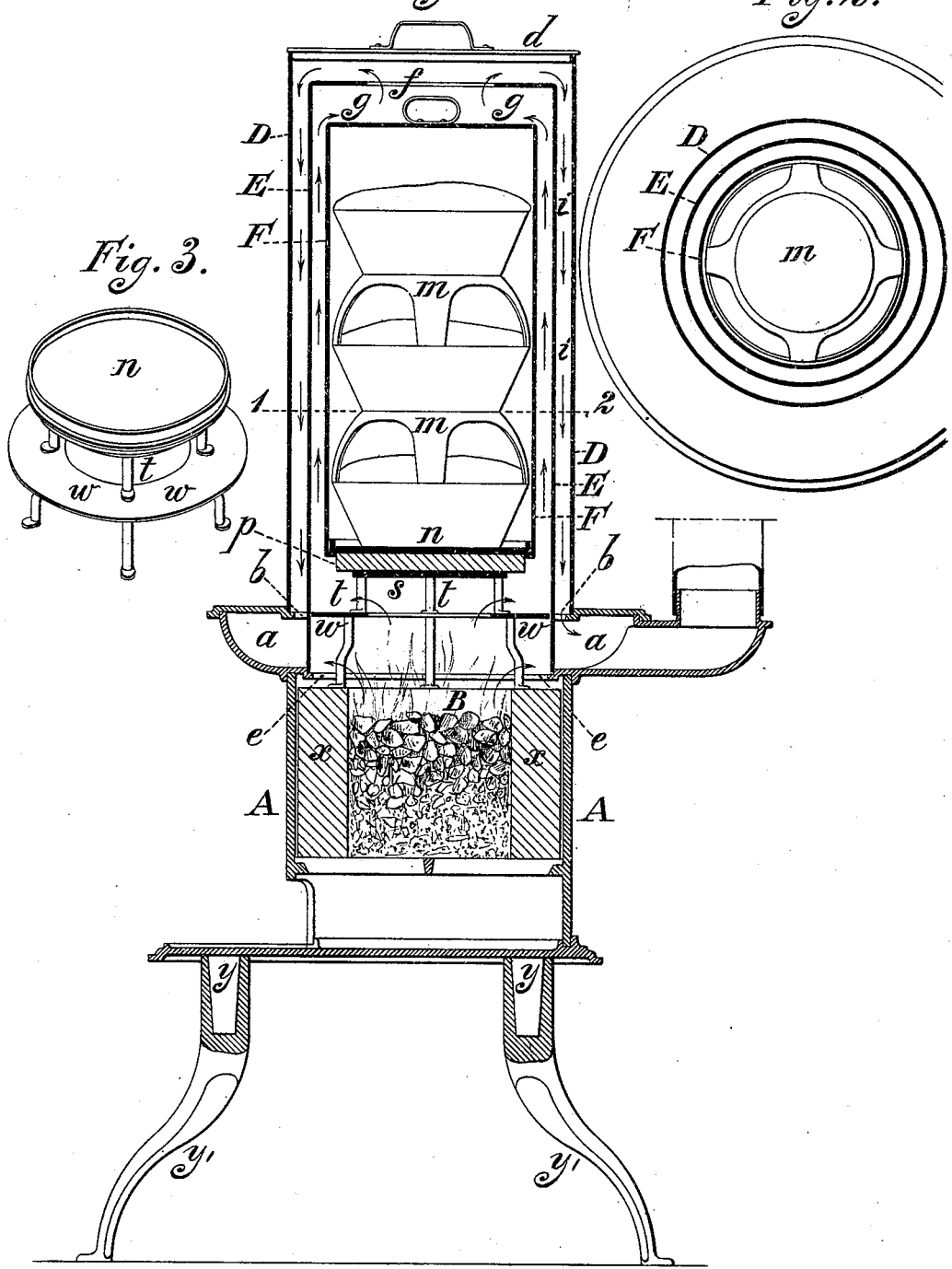

DANIEL MAC ALPIN, OF PHILADELPHIA, PENNSYLVANIA.

PORTABLE OVEN.

SPECIFICATION forming part of Letters Patent No. 231,068, dated August 10, 1880.

Application filed June 24, 1880. (No model.)

*To all whom it may concern:*

Be it known that I, DANIEL MAC ALPIN, a citizen of the United States, residing in Philadelphia, Pennsylvania, have invented an Improvement in Portable Ovens, of which the following is a specification.

The object of my invention is to construct a device for use in connection with an ordinary portable furnace, whereby the dissemination of odors due to cooking operations is prevented and the furnace is adapted for baking. This object I attain in a manner too fully described hereinafter to need preliminary explanation.

In the accompanying drawings, Figure 1 is a vertical section of a portable furnace with my improved detachable oven applied thereto; Fig. 2, a sectional plan on the line 1 2, and Fig. 3 a perspective view of part of the device.

In Fig. 1, A represents the casing, and B the fire-pot, of a portable furnace of the usual construction, said furnace having above the fire-pot a flue, $a$, communicating with the stove-pipe, and having in the top plate the usual opening $b$ for the reception of a culinary vessel. To this opening is fitted the lower end of a cylindrical casing, D, the upper end of which is closed by a suitable cap, $d$; and to a flange, $e$, surrounding the upper edge of the fire-pot B, is adapted the lower end of a cylindrical casing, E, in the upper end of which is an opening, $f$, the casing E being concentric with but somewhat less in diameter than the casing D, so that when the two casings are applied to the furnace, as shown in Fig. 1, the products of combustion are compelled to ascend the chamber $g$, inclosed by the casing E, and then to descend the annular chamber $i$ between the casings D and E, before they reach the flue $a$ and the discharge-pipe.

In the performance of such culinary operations as boiling, frying, broiling, &c., the double casing D E is used for the purpose of carrying off to the chimney the odors given off during the cooking operation, the utensil containing the food to be cooked being inclosed by the inner casing, E, so that the odors are caused to ascend with the products of combustion in the chamber $g$ and descend the annular chamber $i$, escaping finally through the flue $a$ and discharge-pipe to the chimney.

When the device is to be used for baking, however, the pans containing the dough are supported one above another by light frames $m$, and the series of pans are inclosed by a casing, F, the lowest pan of the series resting upon the flanged plate $n$, to which the lower end of the casing F is adapted.

A tile or slab, $p$, of fire-brick or other refractory material, intervenes between the plate $n$ and a plate, $s$, which is supported by feet $t$, resting upon an annular plate, $w$, the latter being also provided with feet which bear on the upper edge of the fire-brick lining $x$ of the fire-pot B.

The casings E and D being applied, as shown in Fig. 1, so that the casing E surrounds the casing F and the supporting-plates, the products of combustion are caused to ascend the annular space between the casings E and F, thereby imparting a high degree of heat to the said casing F and to the air contained therein before descending the annular chamber $i$ and escaping to the chimney.

The full effect of the fresh products of combustion is utilized in heating the casing F and its contents, there being very little loss of heat by radiation, owing to the fact that the spent products of combustion descending the annular chamber $i$ form an air-jacket and prevent the chilling of the inner casing, F, by direct contact of cold air therewith.

The tile or slab $p$ of refractory material prevents the imparting of such a high degree of heat to the plate $n$ as would cause the burning of the dough in the bottom pan of the series.

The furnace has short feet $y$, which are adapted to sockets in the upper ends of the legs $y'$, whereby the furnace may be supported at the proper height to render the oven readily accessible.

The cap $d$ of the casing D and the top of the casing F have suitable handles, whereby said casings may be readily lifted into and out of position, and the casings D and E should be suitably secured together, so as to form in effect one structure.

I claim as my invention—

1. The combination of a furnace having a top flue, $a$, and opening $b$ with the double casing D E, inclosing two chambers, $g$ and $i$, the